UNITED STATES PATENT OFFICE.

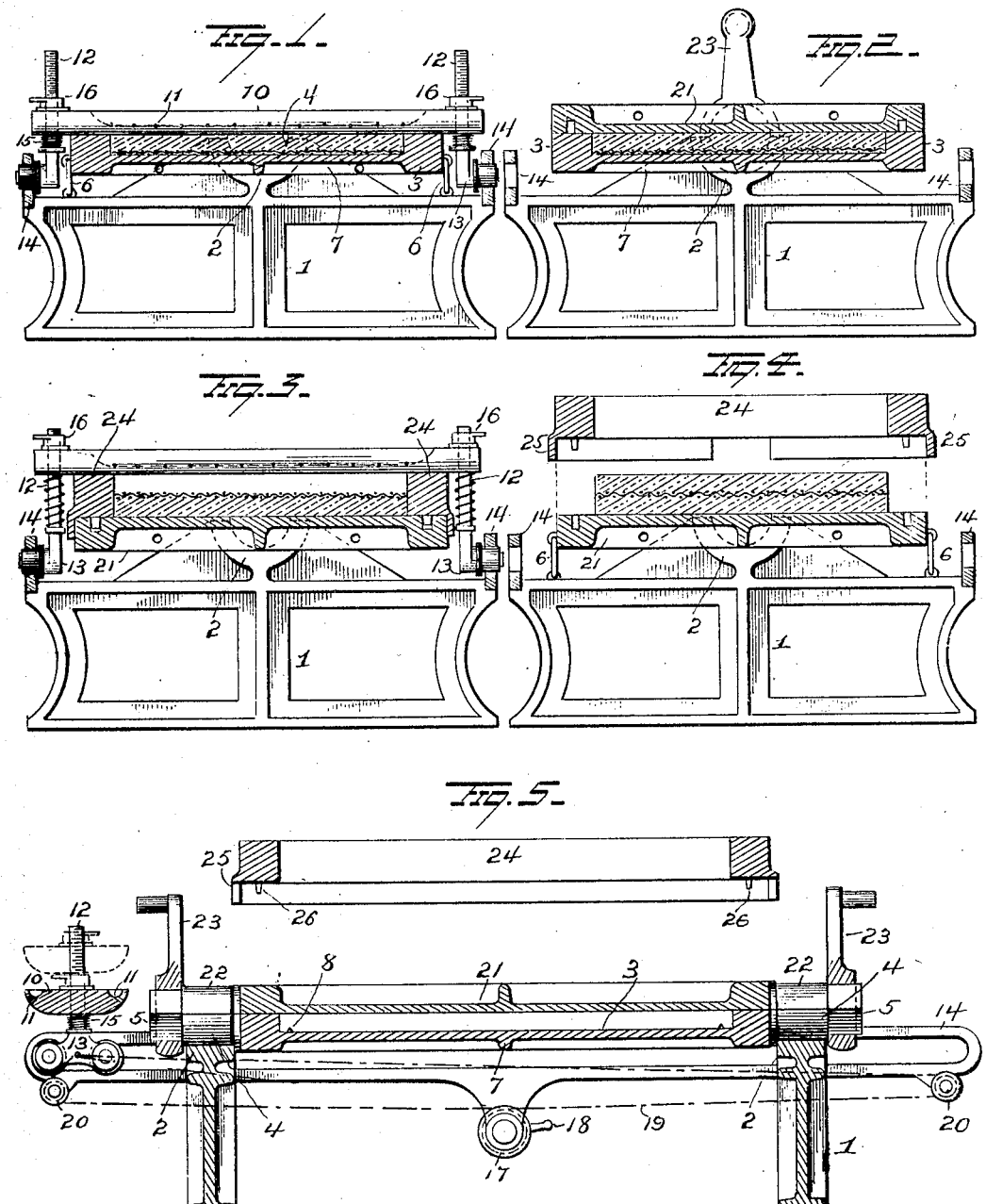

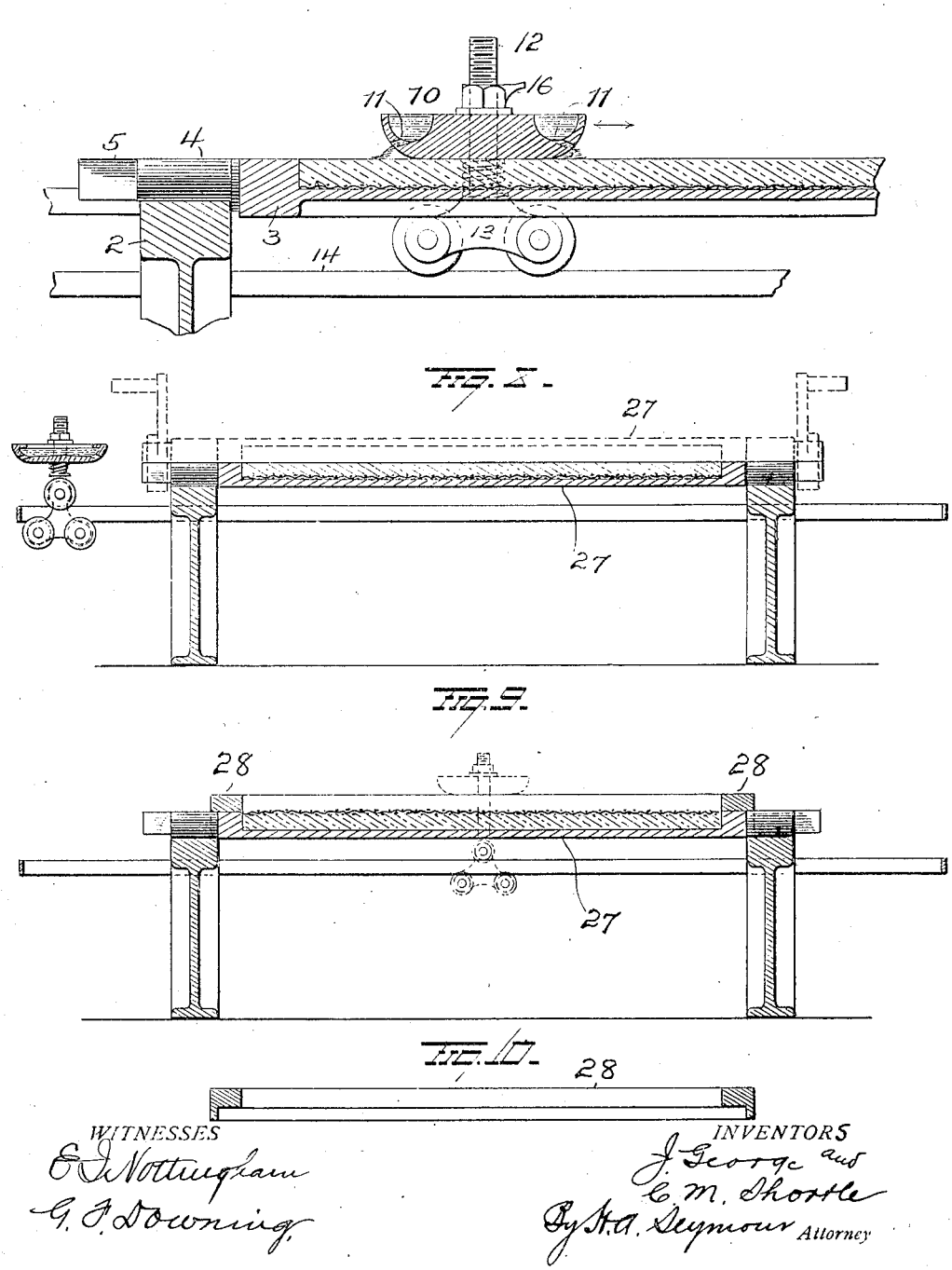

JAPHUS GEORGE, OF WILCOX, PENNSYLVANIA, AND CHRISTOPHER M. SHORTLE, OF BERNHARDS BAY, NEW YORK.

APPARATUS FOR MANUFACTURING WIRE-GLASS.

No. 892,044.    Specification of Letters Patent.    Patented June 30, 1908.

Application filed May 29, 1906. Serial No. 319,314.

*To all whom it may concern:*

Be it known that we, JAPHUS GEORGE, of Wilcox, in the county of Elk and State of Pennsylvania, and CHRISTOPHER M. SHORTLE, of Bernhards Bay, in the county of Oswego and State of New York, have invented certain new and useful Improvements in Apparatus for Manufacturing Wire-Glass; and we do hereby declare the following to be a full, clear, and exact description of the invention, such as will enable others skilled in the art to which it appertains to make and use the same.

Our invention relates to improved apparatus for manufacturing wire glass, the object of the invention being to cast the wire glass in molds and finish the glass with both faces polished, a thing impossible with mechanism heretofore employed, and the invention consists in certain novel features of construction and combinations and arrangements of parts as will be more fully hereinafter described and pointed out in the claims.

In the accompanying drawings, Figures 1, 2, 3 and 4 are views in cross section illustrating our improvements in the several stages of the manufacture of wire glass. Fig. 5 is a view in longitudinal section, Fig. 6 is an end view of the mold. Fig. 7 is an enlarged sectional view showing operation of polisher and Figs. 8, 9 and 10 are views of a modification.

1 represents a supporting frame having half-bearings 2 to support the trunnions of the mold sections, as will hereinafter appear.

3 represents a pan or mold section which is employed as the first step in making wire glass. This pan 3 is provided with semi-cylindrical trunnions 4 resting in bearings 2 and having half square outer ends 5. This pan is secured in a horizontal position by hooks or other suitable devices, is strengthened by webs 7 and provided in its bottom with pins 8 to prevent movement of the wire netting 9 which is located in the bottom of the pan 3, as shown in Fig. 1. The molten glass is then poured into the pan to fill the same and the polisher 10 is then used to polish the surface of the glass in the pan. This polisher comprises a bar having a rounded lower face, and made on its upper face with grooves to receive tallow or other like material, which due to the heat from the glass will melt and flow through the perforations 11 in the bar down onto the glass to lubricate the surface and insure a good polish. The bar 10 is mounted at its ends on upright screw-threaded rods 12 on wheeled trucks 13, the latter movable in grooved tracks 15 at the sides of the frame. Coiled springs 15 are located on the rods 12 below the bar 10 to yieldingly press the bar upwardly against adjusting nuts 16 on the rods.

The polisher 10 is reciprocated over the glass by a drum 17 supported at the center of the frame and provided with an operating crank 18. Ropes or chains 19 secured to the wheeled trucks 13 are passed around pulleys 20 at the ends of the tracks and wound around drum 17 so that by turning the latter the polisher can be moved back and forth over the glass.

The next step in the operation is to place the mold section 21 on the top of pan 3. This mold section 21 has a perfectly smooth lower face to rest against the glass and is provided with semi-cylindrical trunnions 22 and half square ends to fit against trunnions and half square ends 5, so that when crank arms 23 having angular openings are placed on the angular ends of the half trunnions, the mold sections will be locked together and can be turned over. When in this position, pan 3 can be removed leaving the glass with, wire side up on the smooth surface of mold section 21. When in this position, an oblong open frame or mold section 24 is located on mold section 21 as shown in Fig. 3 and is just twice the thickness of pan 3 and provides a receptacle for glass which permits an equal quantity of glass to be poured on top of the wire as that below the same. This frame or mold section 24 is made with a flange 25 and pins 26 to exactly position it on mold section 21 and when positioned as shown in Fig. 3 forms a perfectly tight receptacle for the glass. When the frame 24 is filled with glass, the nuts 16 are adjusted to permit the polisher 10 to move over the surface of the glass in frame 24 and polish the same. After the glass is polished the frame 24 can be removed and the wire glass, polished on both faces will rest on the smooth surface of the mold section 21 and can be disposed of as found most desirable.

All the mold sections are provided with openings for the reception of hooks on cranes or other devices for handling them and we do not of course restrict ourselves to any particular means for the purposes.

In the modification shown in Figs. 8, 9, and 10, the pans 27 are constructed exactly alike and the wire netting is placed in the bottom of one pan and glass poured thereon and the surface polished. The other pan 27 is then held on the glass filled pan by means of the locked trunnions at the end and the pans turned over to bring the wire side up in the second pan. A band or angular ring 28 is then located on the second pan and the glass poured therein and polished. The band 28 has the same depth as the pans so that an equal thickness of glass will be formed at both sides of the wire netting, and as above explained both faces of the glass will be polished.

A great many slight changes might be made in the general form and arrangement of the parts described without departing from our invention and hence we do not restrict ourselves to the precise details set forth but consider ourselves at liberty to make such slight changes and alterations as fairly fall within the spirit and scope of our invention.

Having fully described our invention what we claim as new and desire to secure by Letters-Patent, is:—

1. The combination with means for molding glass, of a polisher and means for subjecting each face of the glass to the action of the polisher.

2. The combination with revoluble glass molding means, of a polisher over the same, and means permitting the operation of the polisher on each face of the glass.

3. The combination of an apparatus for molding wire glass, comprising two pans exactly alike one emptying into the other, and a band to fit around the second pan to increase the depth thereof.

4. The combination of an apparatus for molding wire glass, comprising two pans, half trunnions at the ends of the pans. and crank arms locking the trunnions together to secure the pans together and turn them.

5. The combination of an apparatus for molding wire glass, a polisher movable over the glass, receptacles in the polisher for lubricant melted by the heat of the glass, and orifices in the polisher directing the lubricant onto the glass.

6. A mold for wire glass, comprising a pan having but half the depth of the thickness of glass to be cast, a flat plate to receive the glass from the pan, and an open frame twice the depth of the pan, to rest on the flat plate around the glass and be filled with glass to the top thereof.

7. A mold for wire glass, comprising a pan having but half the depth of the thickness of glass to be cast to receive the wire in its bottom and molten glass thereon, a flat plate secured on the pan and the mold thus formed turned over to deposit the glass wire side up on the flat plate, a frame to fit around the glass and of twice the depth of the pan to receive molten glass on top of the wire, and means for polishing both sides of the glass.

8. In an apparatus of the character described, the combination of a frame, of interchangeable mold sections having rotary mounting on the frame and constructed to permit the glass to be molded one layer at a time, means for polishing the surfaces of the glass, and means on the frame for moving the polisher across the glass.

9. In an apparatus of the character described, the combination with a frame, of mold sections having rotary support on the frame, tracks on the frame, wheeled trucks on the track, a polisher carried by the wheeled trucks and adjustable up and down, and means on the frame for moving the polisher over the mold sections.

10. In an apparatus of the character described, the combination with a frame, of a mold pan having semi-cylindrical trunnions mounted in bearings on the frame and said trunnions made with half square ends, a plate or mold section to fit on the pan and having semi-cylindrical trunnions and half square ends to register with those of the pan, and crank arms having angular openings to fit the square ends of the pan and plate to secure them together and permit them to be turned to bring the plate on the bottom and the pan on top.

11. In a device of the character described, the combination with a mold pan, of a flat plate onto which the glass from the pan is dumped, a frame to fit around the glass on the flat plate and having flanges to fit the plate and pins to enter sockets therein to position the frame, and said frame having twice the depth of the pan.

12. The combination in an apparatus for molding wire glass, of a pan to receive a sheet of wire netting and molten glass and means in the bottom of the pan to engage the wire netting to retain the same flat in said pan.

13. The combination in an apparatus for molding wire glass, of two pans, one emptying into the other and provided with means to engage the wire netting and retain the same flat.

14. In the manufacture of fire-proof material of the character described, means for sustaining a foraminiferous metallic member against a flat surface, while applying fire-proofing material to the exposed side of said metallic member, then reversing said metallic member and applying fire-proof material to the other side thereof.

15. In the manufacture of fire-proof material of the character described, a means for applying a temporary covering to one side of a wire screen, then a permanent covering to the other side of the said screen with a fire-proof plastic compound and for covering the exposed side of the wire screen when the temporary covering is removed.

16. In the manufacture of fire-proof material, a means for sustaining a foraminiferous metallic body against a flat base, means for applying a plastic fire-proof substance to one side of the metallic body, and then applying a similar coating to the other side of said body.

17. In the manufacture of fire-proof material of the character described, a means for applying a temporary covering to one side of a wire screen, then a permanent covering to the other side thereof, and then applying a permanent covering in lieu of the temporary covering.

In testimony whereof, we have signed this specification in the presence of two subscribing witnesses.

JAPHUS GEORGE.
CHRISTOPHER M. SHORTLE.

Witnesses:
S. G. LATTA,
F. W. ALDRICH.